Dec. 15, 1959 M. A. SMITH 2,916,885
CONTROL MECHANISM FOR MULTIPLE ENGINES
Filed June 7, 1954 4 Sheets-Sheet 4

INVENTOR,
MARVON A. SMITH
BY
Lyon Lyon
ATTORNEYS

United States Patent Office 2,916,885
Patented Dec. 15, 1959

2,916,885

CONTROL MECHANISM FOR MULTIPLE ENGINES

Marvon A. Smith, Lakewood, Calif.

Application June 7, 1954, Serial No. 434,916

13 Claims. (Cl. 60—97)

This invention relates to apparatus for regulating the power output of one or more internal combustion engines. The invention finds particular usefulness in connection with a multiple engine power plant for dividing the load equally between the engines.

It is an object of this invention to provide engine control apparatus which is effective to cause an internal combustion engine to operate at a predetermined vacuum pressure in its inlet manifold intake.

It is an object of this invention to provide apparatus to insure that each engine in a multiple engine power plant carries its share of the load.

In the operation of power plants employing a plurality of gas engines of the spark ignition type considerable difficulty has been encountered in distributing the load evenly between the engines. Although the engines in such power plants are substantially duplicates it has been found that considerable variation in manifold pressure occurs between the various engines even when they are coupled together to drive a common load.

Multiple engine power plants of the type commonly employed with well drilling rigs are usually constructed so that all of the engines can be compounded when necessary to raise the drill pipe from the hole. For maximum efficiency it is necessary that each engine carry its share of the load and not merely "float" along with the others. It is known that the various engines are each carrying their proportional share of the load if their manifold pressures are equal.

In accordance with my invention I provide fluid pressure means for operating the throttles of the engines from a common throttle control valve and I also provide a balance line having a predetermined and substantially constant pressure therein. The differential between this balance line pressure and the vacuum pressure existing in each engine manifold is caused to modify the throttle setting for each individual engine. Thus, if a particular engine is not carrying its share of the load its manifold vacuum pressure will be relatively high as compared to the manifold vacuum pressures in the other engines. Accordingly the pressure differential between the balance line and the manifold pressure in this particular engine will be greater than exists for each of the other engines. This differential pressure is then applied as a force to the throttle control mechanism acting in a direction to increase the speed of the engine. This causes the engine to pick up its share of the load.

Procceeding to a description of a preferred embodiment of several modifications of apparatus for carrying out my invention, Figure 1 is a schematic diagram showing a multiple engine power plant embodying my invention.

Figure 6 shows a still further modified form of my invention.

Figure 1:
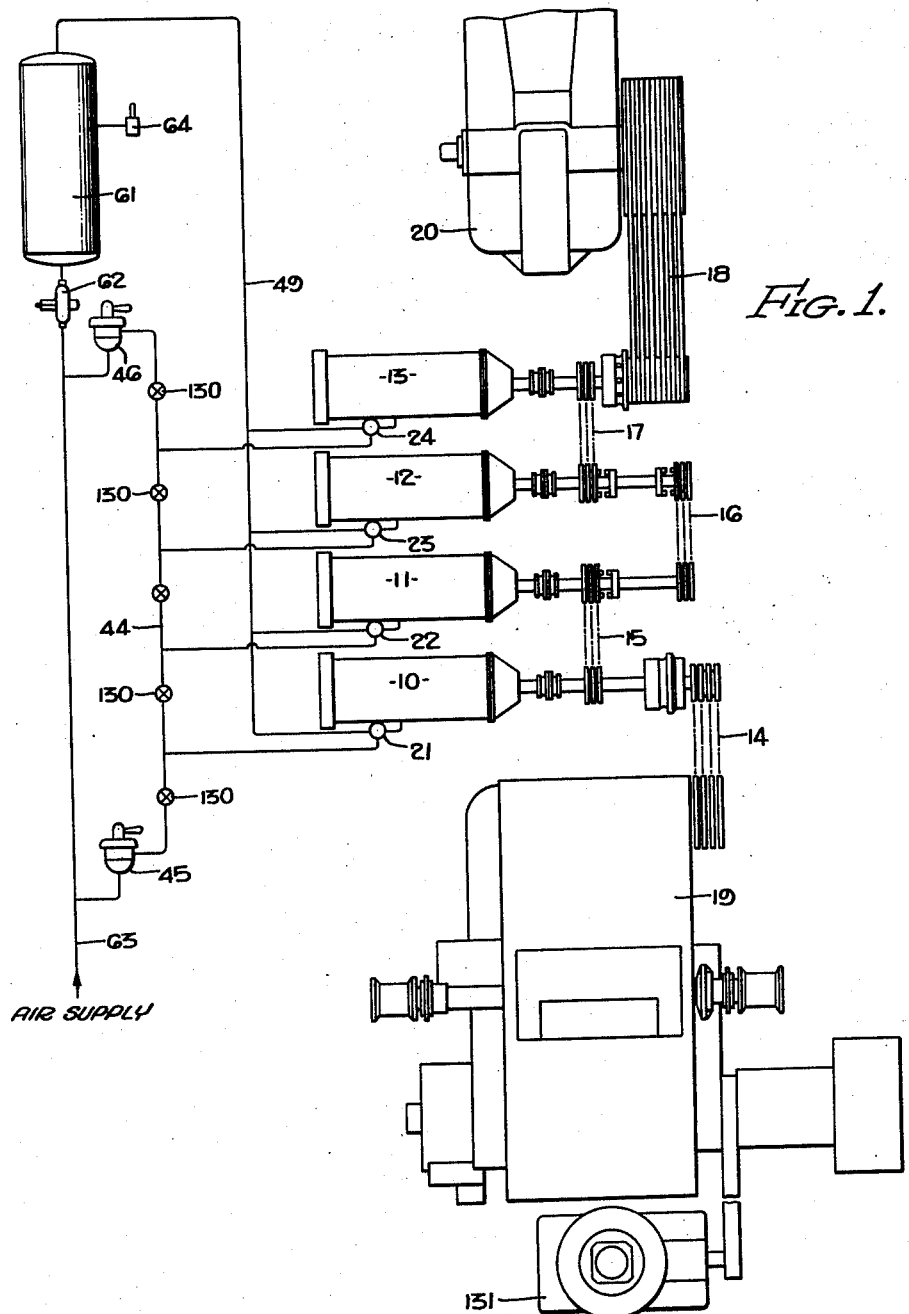

Referring to the drawings:

The multiple engine power plant includes a plurality of engines 10, 11, 12, and 13. Suitable power transmission connections 14, 15, 16, 17, and 18, are provided for driving the drawworks 19 or a pump 20. The engines are of the spark ignition type and may be equipped to run on any suitable fuel such as gasoline, butane, or natural gas. The engines may drive through hydraulic couplings or torque converters (not shown) if desired. They need not necessarily run at precisely synchronous speed but it is highly desirable that they divide the load equally between them.

While I have shown four engines it will be understood that a greater or lesser number may be employed as desired.

Figure 2:
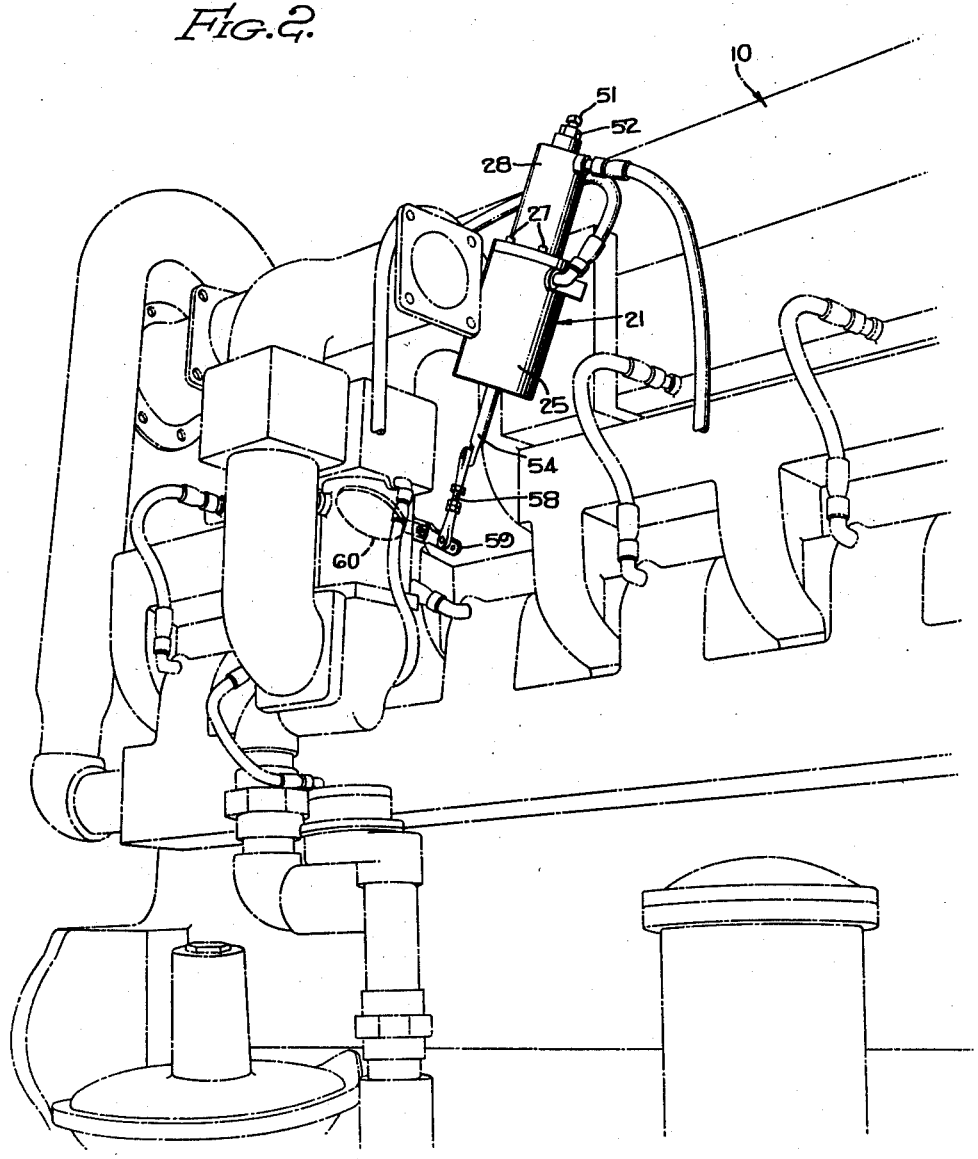
Figure 2 is a perspective view showing an engine having a control device installed thereon and constituting a preferred form of my invention.
Figure 3:
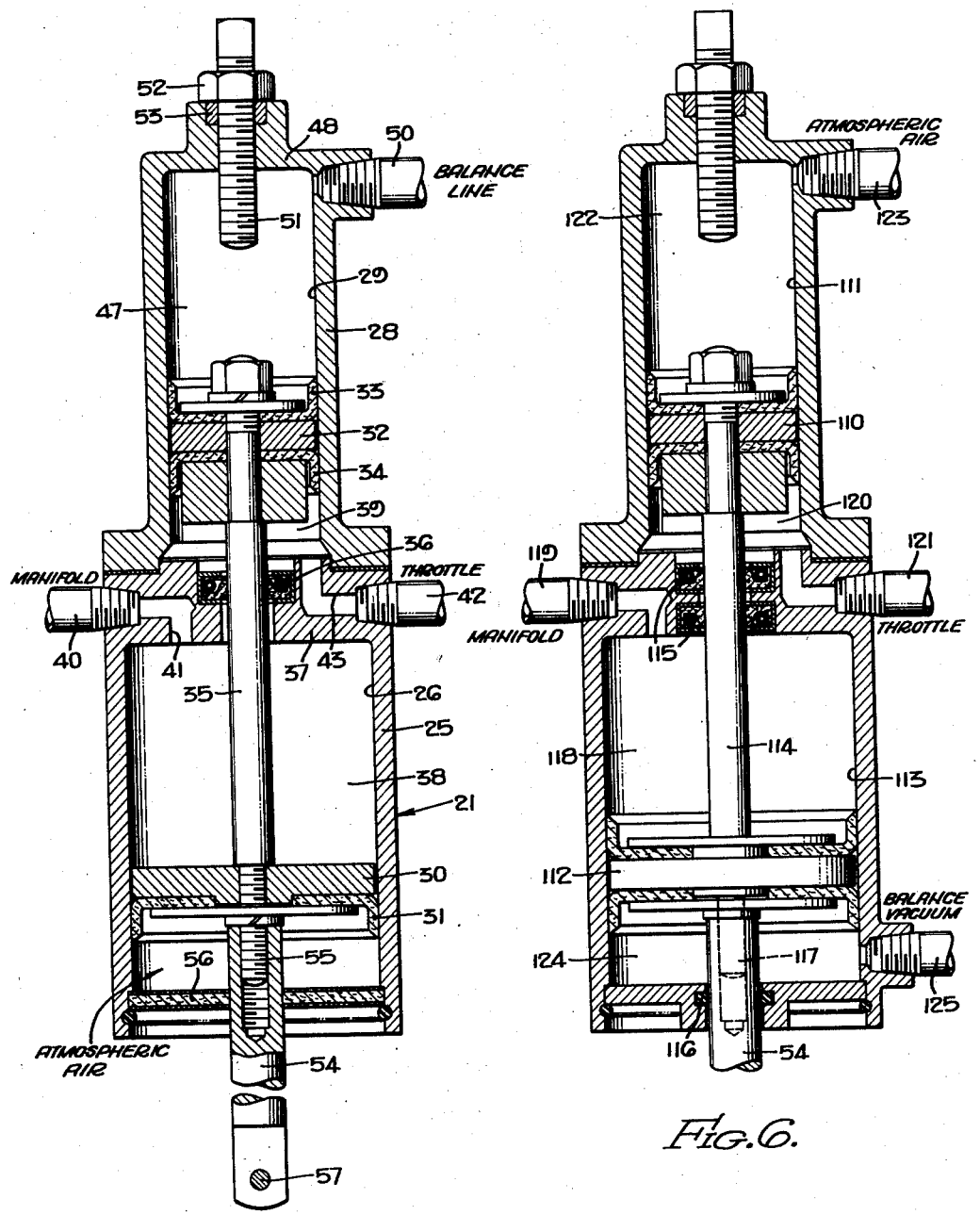
Figure 3 is a longitudinal sectional view of the control device shown in Figure 2.

When the engines are compounded to drive the drawworks 19 the pump drive 18 is disconnected. In order that each of the engines be required to carry its share of the load, and to prevent one or more engines from "floating" with the others, I provide a plurality of throttle actuating devices, 21, 22, 23, and 24, which are substantially duplicates. These devices serve to actuate the throttle valve of each of the engines thereby controlling the rate at which the fuel mixture is supplied to the engine. Figures 2 and 3 show the preferred form of these devices. A housing 25 is provided with a cylindrical bore 26 and is connected by threaded fastening elements 27 to the cap 28. The cap 28 has a smaller cylindrical bore 29. A first piston 30 is mounted within the bore 26 and is provided with a sealing cup 31. A second piston 32 is mounted within the bore 29 and is provided with a pair of oppositely directed sealing cups 33 and 34. A common piston rod 35 connects the pistons 30 and 32. A stationary sealing device 36 slidably engages the piston rod 35 at a location between the pistons 30 and 32. This sealing device 36 may be carried on the end portion 37 of the housing 25.

The pistons and cylinders just described define a first chamber 38 within the bore 26 and between the piston 30 and the end portions 37 of the housing 25. A second chamber 39 is defined within the bore 29 and between the piston 32 and the end portion 37 of the housing 25. The first chamber 38 is connected to the engine intake manifold by way of pipe 40 and passageway 41. The chamber 39 is connected to the pipe 42 by way of passageway 43. The pipe 42 connects to the fluid pressure line 44 and throttle control valves 45 and 46 (see Figure 1). A third chamber 47 is formed within the bore 29 and between the piston 32 and the closed end 48 of the cap 28. This chamber 47 is connected to the balance line 49 by way of the connecting pipe 50. An adjustable stop member 51 is threadedly mounted on the end 48 of the cap 28 and is held in adjusted position by means of the lock nut 52. Packing 53 is provided to prevent leakage.

An actuator rod 54 is connected to the piston rod 35 by means of the threaded connection 55. The rod 54 passes centrally through an annular filter 56. The filter 56 allows atmospheric air to enter the bore 26 below the piston 32 but excludes dust, dirt, and other foreign matter. A pin 57 at the lower end of the actuator rod 54 may be connected to a link 58 of adjustable length and this link in turn is pivotally connected to a crank arm 59 which actuates the throttle valve 60 of the engine 10. When the actuator rod 54 moves downward as viewed in Figure 2 the throttle valve 60 is moved toward closed position.

The balance line 49 is maintained at a predetermined and substantially constant pressure. This pressure may be supplied from a tank 61 and the tank may receive fluid under pressure from a regulator 62 connected to the air supply line 63. As an example, the regulator 62 may be set at 35 p.s.i. and the relief valve 64 may be set at 36 p.s.i. The size of the bore 29 may be chosen with relation to the size of the bore 26 so that the effective area of the piston 32 is approximately one-half of the effective area of the piston 30. In such case the maximum manifold vacuum pressure of 15 p.s.i. applied to the first chamber 38 will not be able to overcome the positive pressure of 35 p.s.i. applied to the chamber 47 from the balance line. A positive pressure from the fluid pressure line 44 greater than 5 p.s.i. is, therefore, required to retract the actuator rod 54, and thereby open the engine throttle valve 60. The position of the pistons 30 and 32 is seen to depend upon the intensity of three different pressures, the vacuum pressure in the suction chamber 38, the positive pressure in the balance chamber 47, and the positive pressure in the control chamber 39. Since the balance line pressure in the chamber 47 is substantially constant the actuator rod 54 is retracted whenever the pressure in the control chamber 39 is increased by actuation of the throttle control valves 45 or 46 or when the manifold vacuum pressure in the chamber 38 increases. An increase in the manifold vacuum pressure from 8 p.s.i. vacuum to 10 p.s.i. vacuum indicates that the engine is dropping a portion of its load and this action serves to retract the actuator rod 54 and thereby move the throttle valve 60 upward to open position. This supplies more fuel to the engine and permits it to carry a greater proportion of the total load.

The stop 51 is moved to contact the upper end of the rod 35 when the engine is running at full speed and delivering maximum power output. The stop 51 limits movement of the rod 35 and hence prevents damage to the throttle valve mechanism.

Figure 4:
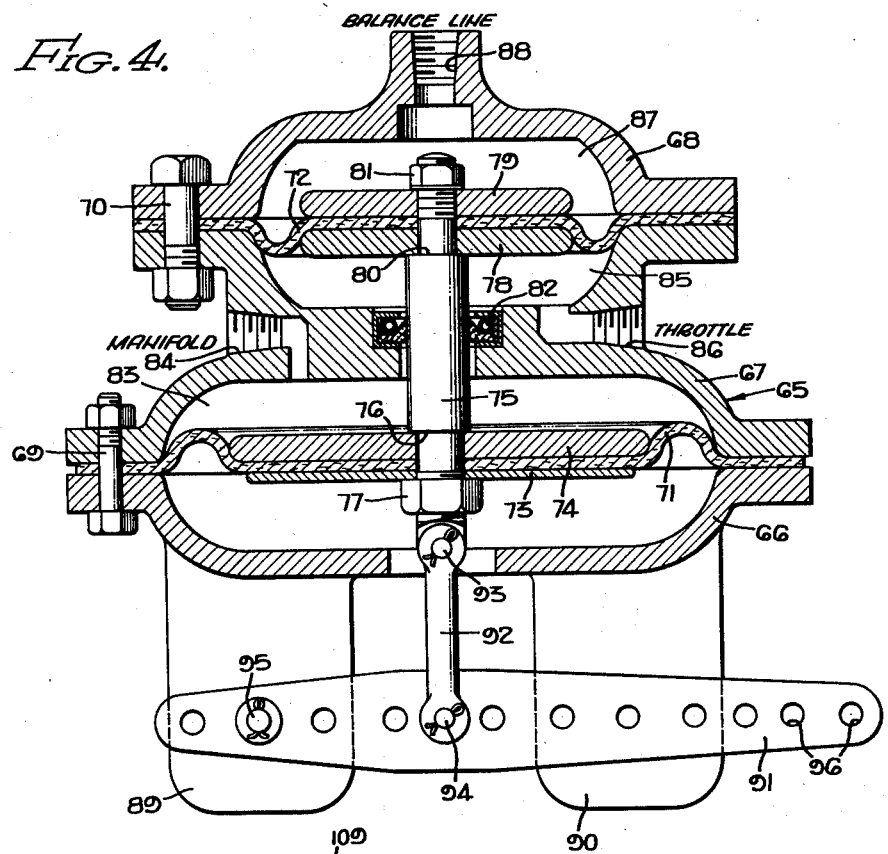
Figure 4 shows a modification thereof.

In the modified form of my invention shown in Figure 4, diaphragm chambers are substituted for the piston and cylinder chambers previously described, and a stroke-multiplying device is provided to produce sufficient travel to operate the throttle valve. The housing, generally designated 65 is divided into three sections, 66, 67, and 68, clamped together by bolts 69 and 70. A first diaphragm 71 is clamped between the housing sections 66 and 67 and a second diaphragm 72 is clamped between the housing sections 67 and 68. The first diaphragm 71 is clamped between annular metal rings 73 and 74 which are fixed to the slide rod 75 between the shoulder 76 and the clamping nut 77. Similarly, the second diaphragm 72 is clamped between annular metal rings 78 and 79 which are carried on the slide rod 75 between the shoulder 80 and the clamping nut 81.

A stationary sealing device 82 slidably engages the rod 75 at a location between the diaphragms 71 and 72. This sealing device is mounted on the housing section 67. The suction chamber 83 within the housing section 67 and between the diaphragm section 71 and the sealing device 82 is connected to the engine manifold through a pipe 40 which connects to the threaded opening 84. The control chamber 85 within the housing section 67 and between the sealing device 82 and diaphragm 72 is connected to the fluid pressure line 44 by a pipe 42 which is connected to the threaded openings 86. The balance chamber 87 is formed within the upper housing section 68 and above the diaphragm 72 and connects with the balance line 49 via the threaded opening 88. Two pairs of ears 89 and 90 are formed integrally with the lower housing section 66 and a lever 91 is mounted to operate between these ears. A link 92 is pivotally connected to the slide rod 75 by means of the pin 93 and is connected to the lever by means of the pin 94. A pin 95 connects the lever to the ears 89.

A series of openings 96 are formed in the lever for connection to a link, not shown. The link may operate the crank arm 59 of the engine throttle valve 60. The pressure in the balance line is applied to the upper side of the diaphragm 72 and pressure from the throttle control line 44 is applied below the diaphragm 72. Suction pressure from the engine manifold is applied above the diaphragm 71 and atmospheric air pressure exists below the diaphragm 71. If the engine should fail to carry its share of the load its manifold suction pressure is relatively high and as a result an upward force is applied to the slide rod 75. Upward movement of the rod 75 causes the lever 91 to move counter clockwise, as viewed in Figure 4. This serves to move the throttle valve 60 toward open position, thereby increasing the rate of fluid mixture to the engine. The engine then picks up its share of the load.

Figure 5:
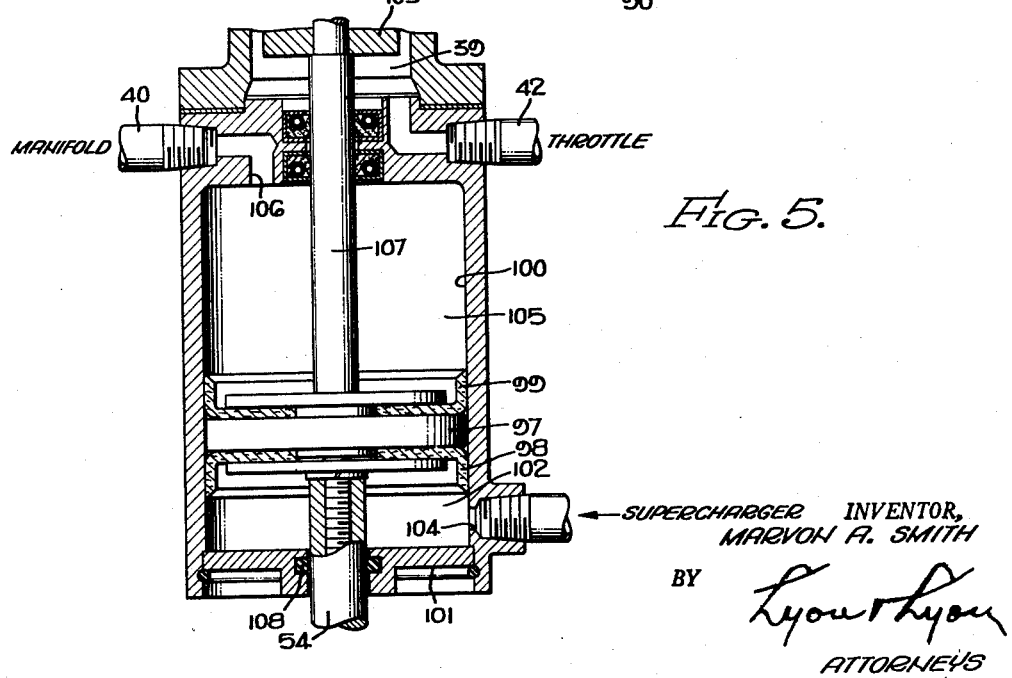
Figure 5 shows another modification.

The modified form of my invention shown in Figure 5 is used when the engines are provided with superchargers. The upper portion of the device is substantially the same as that shown in Figure 1. The piston 97 is provided with oppositely directed sealing caps 98 and 99 which slidably engage the cylindrical bore 100. A seal device 101 cooperates with the piston 97 and bore 100 to define a pressure chamber 102. A pipe 103 leading from the engine super-charger communicates with this chamber 102 by way of the opening 104. The suction chamber 105 communicates with the engine manifold by way of pipe 40 and passageway 106. The pipe 42 from the throttle control line 44 communicates with the chamber 39 as described above. The action of this modified form of my device is substantially the same as that described in connection with that form of my device shown in Figure 3. When the engine is supercharged the vacuum pressure in the manifold must be reckoned in relation to the positive pressure intensity of air furnished by the supercharger. Accordingly the lower side of the piston 97 is subjected to air under supercharger pressure, instead of atmospheric pressure.

An increase in manifold suction pressure raises the piston rod 107 and thereby retracts the actuator rod 54. A sealing ring 108 slidably engages the actuator rod 54 to prevent leakage. It will be understood that the balance line pressure is exerted above the piston 109 in the same manner as described in connection with Figure 3.

It is desirable to avoid the use of springs in the control devices for the throttle valves because it is difficult under field conditions to match the spring-rates of several different spring assemblies. Theoretically it should be possible to employ four different spring assemblies each having the same spring constants and the same spring-rates but in practice this is often difficult to achieve. The balance line 49 has the advantage of supplying the same balancing force to the throttle control device on each of the engines.

In the operation of the various forms of my invention just described the balance line 49 supplies pressure at substantially constant intensity to each of the throttle actuators. This balance line pressure acts in a direction to close the throttle valve. Opposing this balance line pressure are the control pressures from the control line 44 and the suction pressures from the engine intake manifolds. If the engine is supercharged the supercharged air pressure also opposes the action of the balance line pressure. When the operator wishes to compound the power of all of the engines for driving the drawworks and thereby raise a heavy load at maximum speed he opens one of the throttle control valves 45 or 46. This pressurizes the control chamber in each actuator and retracts the rod to open the throttle valve of each engine. If one engine fails to carry its share of the load, its intake vacuum pressure is higher than the others and, therefore, the actuator rod is further retracted, further opening the throttle valve. With additional fuel the engine picks up its share of the load. Conversely, if one engine carries more than its share of the load its vacuum presure is lower than the other engines and consequently the rod of its throttle actuator is extended to reduce the amount of fuel supplied to the engine.

While I have described the throttle actuator as being air operated it will be understood that hydraulic operation is also feasible. In such case the balance line 49 and the control line 44 are both supplied with hydraulic liquid under pressure.

Shut-off valves 130 are provided in the control line 44 so that certain of the engines, for example, engines 12 and 13 may be employed for driving the pump 20 while the other engines 10 and 11 are used to drive the rotary machines 131 by way of the drawworks.

In Figure 6 I have shown a further modification which uses a suction pressure balance line instead of a positive pressure balance line. A device of this type may advantageously be employed where a source of suction pressure, other than the intake manifold of the engine, is available. The suction pressure is substantially constant. The piston 110 travels in the upper cylinder 111 and the piston 112 travels in the lower cylinder 113. A piston rod 114 connects the pistons 110 and 112 and passes through the sealing device 115. The actuator rod 54 is threadedly connected to the piston rod 114 by means of the threads 117 and passes through seal 116.

The suction chamber 118 formed within the cylinder 113 and between the piston 112 and sealing device 115 is connected to the suction manifold of the engine by way of the pipe 119. The control chamber 120 is formed within the cylinder 111 and between the piston 110 and sealing device 115. This chamber is connected to the control line 44 by way of the pipe 121. The upper chamber 122 is formed within the cylinder 111 above the piston 110. This chamber may be opened to atmosphere. The lower chamber 124 is formed within the cylinder 113 and between the piston 112 and the sealing device 116. This lower chamber is connected to a vacuum line 125 which carries substantially constant vacuum pressure from a suitable source (not shown).

In this form of my device shown in Figure 6 the throttle pressure in the control chamber 120 and manifold suction pressure both tend to raise the piston rod 114. Opposing this action is the effect of the substantially constant vacuum pressure in the lower chamber 124 and the atmospheric pressure within the upper chamber 122.

In this modified form of my device, an increase in manifold suction pressure causes the piston rod 114 to be retracted. This retracts the actuator rod 54 and thereby moves the throttle valve 60 toward open position. The additional fuel supplied to the engine then permits it to take up its share of the load. Conversely, a decrease in manifold suction pressure causes the piston rod 114 to be projected downward, thereby moving the throttle valve 60 towards closed position.

While I have described my invention in connection with a multiple engine power plant for drilling wells it will be understood that aircraft power plants or other power plants employing a plurality of engines also come within the scope of my invention. Furthermore, certain aspects of my invention may be employed in a power plant having a single engine in order to limit maximum horsepower output therefrom.

Having fully described my invention, it is to be understood that I do not wish to be limited to the details herein set forth but my invention is of the full scope of the appended claims.

I claim:

1. In a control system for a plurality of engines connected to drive a common load, each engine being of the type having an intake manifold and a throttle valve associated therewith, the combination of: a throttle valve actuator attached to each engine, each actuator having a stationary housing including axially aligned cylinders, a piston mounted in each cylinder, a movable rod connecting said pistons, means whereby the rod may actuate the throttle valve, a stationary seal device on the housing slidably engaging the rod at a location between the pistons, the parts forming a suction chamber within one cylinder between its respective piston and the seal device, and forming a control chamber within the other cylinder between said seal device and the other piston, and forming a balance chamber within the latter said cylinder on the other side of the latter said pistoin, means connecting the suction chamber to the intake manifold of its respective engine, a control line having a control valve therein and connected to the control chamber in each actuator and a balance line connected to each balance chamber in said actuator to equalize the pressures in the balance chambers.

2. In a system wherein a plurality of engines are interlocked together to drive a common load irrespective of the contribution of any engine, each engine including an intake manifold and a throttle valve, of apparatus for causing each engine to assume its proportionate share of the load, comprising: a throttle valve actuator for each engine including means defining a major and minor chamber disposed in tandem and seperated by a fixed wall, a road extending through said fixed wall, movable walls dividing said chambers into opposed proximal and distal compartments and attached to said rod for movement in unison; means connecting each rod with the throttle valve of the corresponding engine; means for exposing the distal compartments of said major and minor chambers to substantially constant pressures; means for supplying control fluid under variable but equal pressures to the proximal compartments of the minor chambers of all of said throttle valve actuators; lines connecting the proximal compartments of the major chambers of said throttle valve actuators with the intake manifolds of their respective engines, whereby the pressures therein reflect the manifold pressures in their corresponding engines, thereby causing said rods and connecting means to shift said throttle valves until the manifold pressures in said engines are equalized and each engine assumes its proportionate share of the load.

3. A power plant, comprising: a plurality of internal combustion engines, each having an intake manifold and a throttle valve; a drive mechanism interconnecting said engines to drive a common load irrespective of the contribution of any engine to said load; a throttle valve actuator for each engine including means defining a major and minor chamber disposed in tandem and separated by a fixed wall, a rod extending through said fixed wall, movable walls dividing said chambers into opposed proximal and distal compartments and attached to said rod for movement in unison; means connecting each rod with the throttle valve of the corresponding engine; means for exposing the distal compartments of said major and minor chambers to substantially constant pressures; means for supplying control fluid under variable but equal pressures to the proximal compartments of the minor chambers of all of said throttle valve actuators; lines connecting the proximal compartments of the major chambers of said throttle valve actuators with the intake manifolds of their respective engines, whereby the pressures therein reflect the manifold pressures in their corresponding engines, thereby causing said rods and connecting means to shift said throttle valves until the manifold pressures in said engines are equalized and each engine assumes its proportionate share of the load.

4. A system as set forth in claim 2, wherein: said major and minor chambers are cylinders and said movable walls are pistons.

5. A system as set forth in claim 2, wherein: said movable walls are diaphragms.

6. A system as set forth in claim 2, wherein: the distal end of said minor chamber is exposed to a predetermined balancing pressure above atmospheric pressure; and the distal end of said major chamber is exposed to atmospheric pressure.

7. A system as set forth in claim 2, wherein: the distal end of said minor chamber is exposed at atmospheric pressure; and the distal end of said major chamber is exposed to a predetermined balancing pressure.

8. A system as set forth in claim 2, wherein: the distal end of one of said chambers is exposed to the output pressure from a supercharger.

9. A system as set forth in claim 3, wherein: said major and minor chambers are cylinders and said movable walls are pistons.

10. A system as set forth in claim 3, wherein: said movable walls are diaphragms.

11. A system as set forth in claim 3, wherein: the distal end of said minor chamber is exposed to a predetermined balancing pressure above atmospheric pressure; and the distal end of said major chamber is exposed to atmospheric pressure.

12. A system as set forth in claim 3, wherein: the distal end of said minor chamber is exposed to atmospheric pressure; and the distal end of said major chamber is exposed to a predetermined balancing pressure.

13. A system as set forth in claim 3, wherein: the distal end of one of said chambers is exposed to the output pressure from a supercharger.

References Cited in the file of this patent

UNITED STATES PATENTS

| | | |
|---|---|---|
| 1,731,389 | Melcher | Oct. 15, 1929 |
| 2,148,305 | Sanford | Feb. 21, 1939 |
| 2,284,687 | Schimanek | June 2, 1942 |
| 2,343,718 | Udale | Mar. 7, 1944 |
| 2,365,384 | Bonnier | Dec. 19, 1944 |
| 2,453,377 | Lozivit | Nov. 9, 1948 |
| 2,464,636 | Eaton | Mar. 15, 1949 |
| 2,521,299 | Mallory | Sept. 5, 1950 |
| 2,521,736 | Mallory | Sept. 12, 1950 |
| 2,527,354 | Christian | Oct. 24, 1950 |
| 2,585,814 | McDonald | Feb. 12, 1952 |
| 2,714,290 | Rachuig | Aug. 2, 1955 |